(12) United States Patent
Pokhariyal et al.

(10) Patent No.: US 7,302,381 B2
(45) Date of Patent: Nov. 27, 2007

(54) SPECIFYING ARBITRARY WORDS IN RULE-BASED GRAMMARS

(75) Inventors: Shuvranshu Pokhariyal, Hillsboro, OR (US); Shirish Aundhe, Beaverton, OR (US); Jason Davidson, Forest Grove, OR (US); Thomas Hernandez, Portland, OR (US); Corey Gough, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 906 days.

(21) Appl. No.: 09/752,994

(22) Filed: Dec. 30, 2000

(65) Prior Publication Data

US 2002/0123876 A1     Sep. 5, 2002

(51) Int. Cl.
    G10F 17/20    (2006.01)
(52) U.S. Cl. .......................................................... 704/1
(58) Field of Classification Search .................. 704/9, 704/225, 1, 209, 231, 270, 258, 4, 10; 707/104.1, 707/5; 715/536
    See application file for complete search history.

(56) References Cited

U.S. PATENT DOCUMENTS

| | | | |
|---|---|---|---|
| 6,078,885 A * | 6/2000 | Beutnagel | 704/258 |
| 6,243,713 B1 * | 6/2001 | Nelson et al. | 707/104.1 |
| 6,266,642 B1 * | 7/2001 | Franz et al. | 704/277 |
| 6,278,967 B1 * | 8/2001 | Akers et al. | 704/2 |
| 6,983,239 B1 * | 1/2006 | Epstein | 704/9 |
| 2002/0143529 A1 * | 10/2002 | Schmid et al. | 704/231 |
| 2004/0024584 A1 * | 2/2004 | Brill | 704/9 |
| 2005/0223042 A1 * | 10/2005 | Evans et al. | 707/104.1 |

* cited by examiner

Primary Examiner—David Hudspeth
Assistant Examiner—Jakieda R. Jackson
(74) Attorney, Agent, or Firm—Molly A. McCall

(57) ABSTRACT

A method and apparatus are described for specifying arbitrary words in a rule-based grammar, such as a context-free grammar. A wildcard identifier is used in a context-free grammar file in place of a predefined category of words. Artificial phoneme combinations that represent generic words in a speech engine's vocabulary database, and that represent pronunciations of the predefined category of words are defined by rules. A speech engine uses the artificial phoneme combinations to determine acceptable words to listen to, and generates a results object comprising generic words corresponding to the artificial phoneme combinations, as well as non-generic words that do not exist in a given CFG, where the generic and non-generic words exist in the speech engine's vocabulary database. The word having the highest confidence level that is not a generic word is selected as the word most likely to have been spoken by the user.

20 Claims, 6 Drawing Sheets

SPECIFYING ARBITRARY WORDS IN RULE-BASED GRAMMARS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Intel Corporation, All Rights Reserved.

FIELD OF THE INVENTION

This invention relates to the field of speech recognition, and more specifically, to specifying arbitrary words in rule-based grammars, therefore bypassing the need to specify all possibilities of a spoken word at the time a rule-based grammar is written.

BACKGROUND OF THE INVENTION

Speech processing provides a compelling need for more computing power, and is important in making the PC (personal computer) more accessible and productive. Any speech engine has a process for recognizing human speech and turning it into something the computer understands. In effect, the computer needs a translator. Every speech engine uses many operations to listen to and understand human speech. Some of these are described below:
- Word separation is the process of creating discreet portions of human speech. Each portion can be as large as a phrase or as small as a single syllable or word part.
- Vocabulary is a list of speech items that the speech engine can identify.
- Word matching is a method that the speech engine uses to look up a speech part in the systems' vocabulary—the search engine portion of the system.
- Speaker dependence is the degree to which the speech engine is dependent on the vocal tones and speaking patterns of individuals.
- Grammar rules are used by speech recognition (SR) software to analyze human speech input, and in the process, attempt to understand what a person is saying.

When writing speech processing applications, many types of grammars can be used. Grammars can be divided into three types. Dictation grammars use the context in which words are spoken to enable a speech engine to recognize words from a dictation vocabulary provided with the speech engine. Dictation grammars are typically used in applications that allow users to dictate freely into an edit control. Limited domain grammars are useful in situations where the vocabulary of a system need not be very large. Examples include systems that use natural language to accept command statement.

Rule-based grammars, such as context-free grammars (hereinafter "CFG"), on the other hand, use rules to determine what the speech engine recognizes. In a CFG, a grammar text file contains rules defining the patterns and combinations of words and phrases that the speech engine will recognize when users speak them. While CFGs offer a great degree of flexibility when interpreting human speech, a particular CFGs accuracy is limited to the words, rules, and lists defined for the CFG, as the grammar must be completely specified prior to or during runtime. As a result, CFGs currently cannot be used for specifying arbitrary words. While dictation grammars can be used to specify arbitrary words, the tradeoff is that dictation grammars consume more CPU (central processing unit) power.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
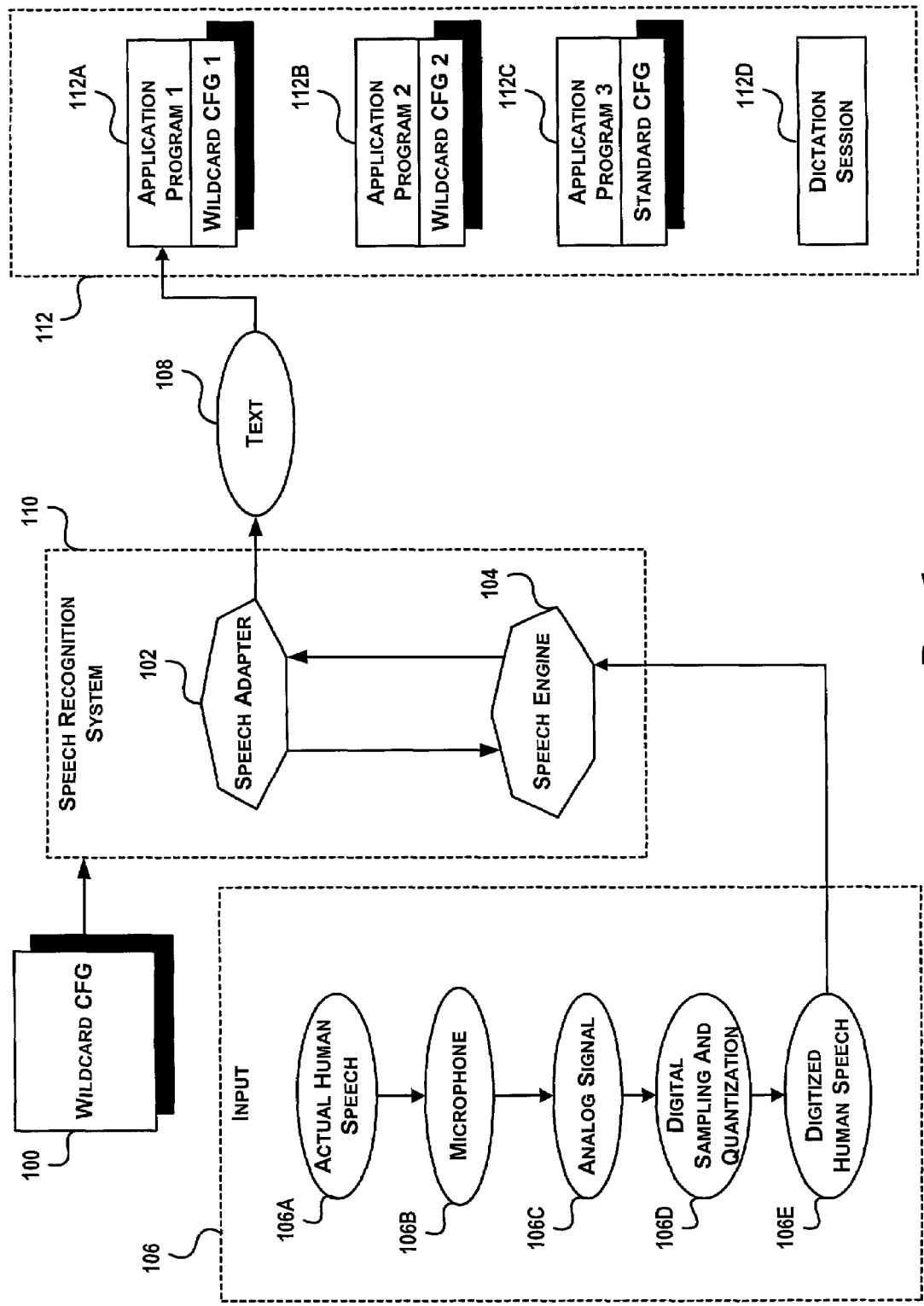
FIG. 1 is a block diagram illustrating a speech recognition system that accepts a wildcard context-free grammar (CFG) as input.

In one aspect of the invention, a method for specifying arbitrary words in a context-free grammar (CFG) file is disclosed. For instance, a user may specify an asterisk (i.e., "*") as a wildcard identifier for instances of user names (e.g., "Tom", "Mary", "Joe"), without having to specify every possibility of a user name in the CFG file. A wildcard CFG is created which has a wildcard identifier specified for instances of a predefined category of words (e.g., user names), where the words all exist in a speech engine's vocabulary database.

Generally, artificial phoneme combinations that represent pronunciations for the predefined category of words, and that represent generic words in the speech engine's vocabulary database are specified using predefined rules. Instances of the wildcard identifier are substituted with a set of artificial phoneme combinations, such that the artificial phoneme combinations can be matched with generic words in the speech engine's vocabulary database (also known as a dictation grammar).

As a further aspect of the invention, a method for selecting an arbitrary word specified by a wildcard identifier in a CFG that is returned as one of a plurality of potential phrases spoken by a user is disclosed. When a speech engine recognizes human speech, a results object comprising a number of potential phrases that were spoken by the user is returned, where the potential phrases are based on a selected CFG. For a given wildcard word (i.e., the part of a spoken phrase that is generically represented by a wildcard identifier in the wildcard CFG), one or more generic words representing one or more artificial phoneme combinations having the highest confidence levels corresponding to the wildcard word are chosen. One or more other words from the speech engine's vocabulary database that are not part of the CFG, and which have the same phoneme combination are also chosen. Each of the words is assigned a confidence level based on a set of rules followed by a given speech engine. Since the generic word is not a true representation of a spoken word, the one or more generic words are removed as candidates, and the word having the highest confidence level that is not part of the CFG is chosen. As a result, the phrase in the results object having this word is returned as the phrase spoken by the user.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Speech recognition fundamentally functions as a pipeline that converts digital audio from a sound card into recognized speech. The elements of a pipeline can be broken down as follows:

1. Human speech in the form of digital audio from a sound card is taken as input by a speech engine.
2. Select and apply a grammar so the speech engine knows what phonemes to expect. A grammar can be anything from a context-free grammar to full-blown English.
3. Figure out which phonemes are spoken.
4. Convert the phonemes into words.

PHONEMES

Phonemes are the smallest unique sound part of a language, and can be numerous. For example, while the English language has 26 individual letters, these letters do not represent the total list of possible phonemes, since a letter may be represented by a plurality of phonemes depending on the word in which the letter is used.

A speech engine comprises a vocabulary database, and a lexicon of pronunciations for the words in its vocabulary database. Since multiple words may have the same pronunciation, a phoneme combination may be matched to, or correspond to, more than one word. For example, the phoneme combination (or pronunciation) "r", "eh", and "d" may correspond to the words "red" and "read" in a speech engine's pronunciation lexicon.

When a word is spoken by a user, a probability analysis is performed on the word to determine the one or more phonemes comprising the word. Based on the probability analysis, one or more phoneme combinations are determined for a word. A phoneme combination having the highest probability is then matched to the pronunciations in the speech engine's lexicon. The corresponding matched words from the speech engine's vocabulary database are then selected as possible words spoken by the user.

Each of the selected words is then assigned a confidence level based on a complex set of rules used by the speech engine. For example, words which are part of a particular application (such as a particular CFG) are given the highest confidence level. As another example, if the speech engine knows that English has been spoken (i.e., based on the application being used by the user), then an English word will have a higher confidence level than some foreign word.

GRAMMAR

The system and method described above are preferably implemented using a rule-based grammar, such as a context-free grammar (hereinafter referred to as a "CFG"). A CFG uses rules to determine what a speech engine recognizes. When a CFG is written, it contains rules that define the patterns and combinations of words and phrases that a speech engine will recognize when a user speaks them. When human speech is recognized, a speech engine applies a grammar. While performing speech recognition, the speech engine typically considers all the grammars registered with it. The speech engine is configured to load the grammar associated with the active application.

In a CFG, a speech engine knows what phoneme combinations to expect, since all words must be specified in the CFG. As a result, the speech engine can expect a certain sequence of phoneme combinations, without having to hypothesize on different phoneme combinations, and can then find the corresponding word in speech engine's vocabulary database.

For example, the following is an example of a CFG file:

```
[<Start>]
<Start> = (Programs)
[(Programs)]
100 = send mail to <Friends>
.
.
.
[Lists]
=Friends
[Friends]
=Tom
=Laura
=Russ
```

The mechanisms used by speech engines differ in the way they arrive at the recognized phrase. In general, signal processing is first performed on the phrase spoken to generate a phonemic representation. This is then used as a basis for lexical, grammatical, and other rules to determine the phrase uttered.

If a user says "send mail to Tom", where the CFG file defined above exists in a given speech engine, the speech engine (processing an isolated word) could process the sound as follows. Using probability analysis, it determines that the phoneme combination having the highest confidence level is associated with the word "send" by comparing the phoneme combination with the highest confidence level to the pronunciation lexicon in the speech engine. Since it knows the CFG to use, it then expects to hear "mail" in this example. Thus, if the next word spoken is associated with the highest confidence level phoneme combination that sounds like "mail", a confidence level is assigned to each word in the speech engine's vocabulary database corresponding to that phoneme combination. (If the spoken word doesn't sound like "mail", then an error, such as "NOT IN GRAMMAR", is returned.) Since the phoneme combination corresponding to "mail" may also correspond to the word "male", confidence levels are assigned to the word "mail" as well as "male". Typically, the word in the CFG is assigned the highest confidence level. In this example, that word is "mail" rather than "male". As a result, "mail" is returned by the speech engine as the spoken word.

The speech engine then expects to hear the word "to". Thus, if the next word spoken is associated with the highest confidence level phoneme combination that sounds like "to", a confidence level is assigned to each word in the speech engine's vocabulary database corresponding to that phoneme combination. (If the spoken word doesn't sound like "to", then an error is returned.) Since the phoneme combination corresponding to "to" may also correspond to "two", or "too", confidence levels are assigned to each of those words. In this example, the word having the highest confidence level is "to" rather than "two" or "too". As a result, "to" is returned by the speech engine as the spoken word.

For the last word in the spoken phrase, the speech engine expects to hear one of three words: "Tom", "Laura", or "Russ". Thus, if the next word spoken is associated with the highest confidence level phoneme combination that sounds like "Tom", a confidence level is assigned to each word in the speech engine's vocabulary database corresponding to the phoneme combination. (If the spoken word doesn't sound like "Tom", "Laura" or "Russ", then an error is returned.) In this case, it is likely that only one word corresponds to such a phoneme combination. As a result, "Tom" is returned by the speech engine as the spoken word.

In the example given, it is apparent under current CFG capabilities that each name that a user is expected to speak must be specified in the CFG, or the speech engine will error out.

In general embodiments of the invention, as shown in FIG. 1, a wildcard CFG 100 is processed by a speech recognition system 110 having a speech adapter 102 and a speech engine 104. The speech engine 104 may have may applications 112 (112A, 112B, 112C, 112D) registered with it. Input 106 in the form of human speech is accepted by the speech recognition system 110. Actual human speech 106A is inputted to a microphone 106B, generating an analog signal 106C. Using digital sampling and quantization 106D, the analog signal 106C is converted to digitized human speech 106E, which is then fed into the speech engine 104 of the speech recognition system 110. When digitized human speech 106E is recognized by the speech engine 104, the speech adapter 102 and speech engine 104 interact, allowing the speech adapter 102 to produce text 108 that was most likely to have been spoken by the user. The text is then inputted to one of many applications (in this example, 112A) that may be registered with the speech engine. While only one speech adapter is shown in this diagram, it should be understood by one of ordinary skill in the art that each application or CFG could have its own speech adapter.

When digitized human speech 106E is recognized by the speech engine 104, several stages take place. During pattern recognition, the speech signal is decoded to a quasi unique sequence of phonemes. During the word and phrase formation stage, the speech engine performs searches in an effort to match the phonemes to words in its vocabulary database. The search engine selects a CFG to use. If it encounters a wildcard in a CFG, the search engine, using a search algorithm, considers replacing the wildcard in a sensible way. Usually, it is replaced by a word in the speech engine's vocabulary database. In less likely cases, the wildcard is replaced by doing a direct mapping to the alphabet. As is known by one of ordinary skill in the art, the search engine typically forms a tree of possible combinations, and then uses a sorting/searching algorithm, such as Viterbi's algorithm. The speech engine then uses its vocabulary database to match phonemes to words.

In one embodiment of the invention, the current state of speech engines is assumed, such that speech engines do not need to be modified to implement methods in accordance with embodiments of this invention. Since existing speech engines do not recognize wildcards, a wildcard CFG is converted to a CFG recognized by speech engines. In another embodiment of the invention, a speech engine may be modified to incorporate the functions described herein. In these embodiments, the speech engine is able to read a wildcard CFG.

Wildcard CFG

A wildcard CFG is a CFG in which a wildcard identifier is specified to replace a predefined category of words. A predefined category of words may comprise user names, such as "Tom", "Laura", and "Russ", as in the example above. The following is an example of a wildcard CFG corresponding to the CFG shown in the example above:
[<Start>]
<Start>=(Programs)
[(Programs)]
100=send mail to <*>

Since a wildcard identifier is used, the need to specify every possibility of a user name is eliminated. As will be discussed, the wildcard identifier "*" in this example is replaced by a set of artificial phoneme combinations that are specific to the predefined category of words represented by the wildcard identifier which eventually allows the speech adapter to return text spoken by the user to an application.

Phoneme CFG

Since a speech engine expects to hear certain words when using a CFG, a wildcard identifier in a CFG would normally cause the speech engine to error out. As a result, artificial phoneme combinations are specified using a set of rules and phonemes in a phoneme CFG for the purpose of causing the speech engine to perform probability analysis, to find the phoneme combination in its vocabulary database, and to assign confidence levels to selected words in its vocabulary database, and for the purpose of preventing a speech engine from erroring out when it encounters a wildcard identifier. Artificial phoneme combinations are the combinations of phoneme which are generated for the purpose of preventing the speech engine from erroring out. While artificial phoneme combinations will typically result in the speech engine finding a generic word, it does not prevent the speech engine from finding a non-generic word (i.e., words that are in the speech engine's vocabulary database, but that are not part of a given CFG).

While phonemes are discussed herein for generating unique sounds in a language, it should be understood by one of ordinary skill in the art that any technique for this purpose could be used. For example, diphones, (combinations of two phonemes) or triphones may alternatively be specified. Generally speaking, phonemes, diphones, triphones, and the like can be categorized as unique sounds in a language. The point is that whatever technique is used should cater for a broad range of possibilities so that a speech engine can return a word closest to what it would have in its vocabulary database.

The following is an example of a phoneme CFG file that defines artificial phoneme combinations for the wildcard identifier corresponding to the predefined category of words for user names:

```
= [opt] Consonants [opt] FrontVowels [opt] Plosives
= [opt] Consonants [opt] FrontVowels [opt] Nasals
= [opt] Consonants [opt] FrontVowels [opt] Fricatives
= [opt] FrontVowels [opt] Plosives [opt] Consonants
= [opt] Plosives [opt] BackVowels [opt] Nasals
= [opt] Retroflexes [opt] BackVowels [opt] Nasals
= [opt] Fricatives [opt] BackVowels [opt] Nasals
...
[ (FrontVowels) ]
=eeh
=aih
=oh
=Lee
...
[ (BackVowels) ]
=uuh
=owe
=awe
...
[ (Consonants) ]
...
[ (Plosives) ]
=Poh
=Pee
=To
=Too
...
[ (Nasals) ]
=No
=Nay
=Nih
=Am
=An
=ohm
...
[Fricatives]
=Fro
=Shi
=Shu
=Zee
...
[Retroflexes]
=Roh
=or
=ra
```

The artificial phoneme combinations represent generic words that are in the speech engine's vocabulary database. Generic words in a speech engine's vocabulary database comprise fricatives, vowels, and consonants, for instance. For example, using the rules and phonemes in the example above, the rule:

=[opt] FrontVowels [opt] Plosives [opt] Consonants may produce the following artificial phoneme combinations, assuming these artificial phoneme combinations also represent generic words in the speech engine's vocabulary database:

eeh poh
eeh pee
eeh to
eeh too
aih poh
aih too and the following rule:
=[opt] Plosives [opt] BackVowels [opt] Nasals may produce the following artificial phoneme combinations, assuming these artificial phoneme combinations also represent generic words in the speech engine's vocabulary database:

poh uuh an
owe nay
to ohm
too awe nih

Substituting Wildcard Identifiers With Artificial Phoneme Combinations

Figure 2:
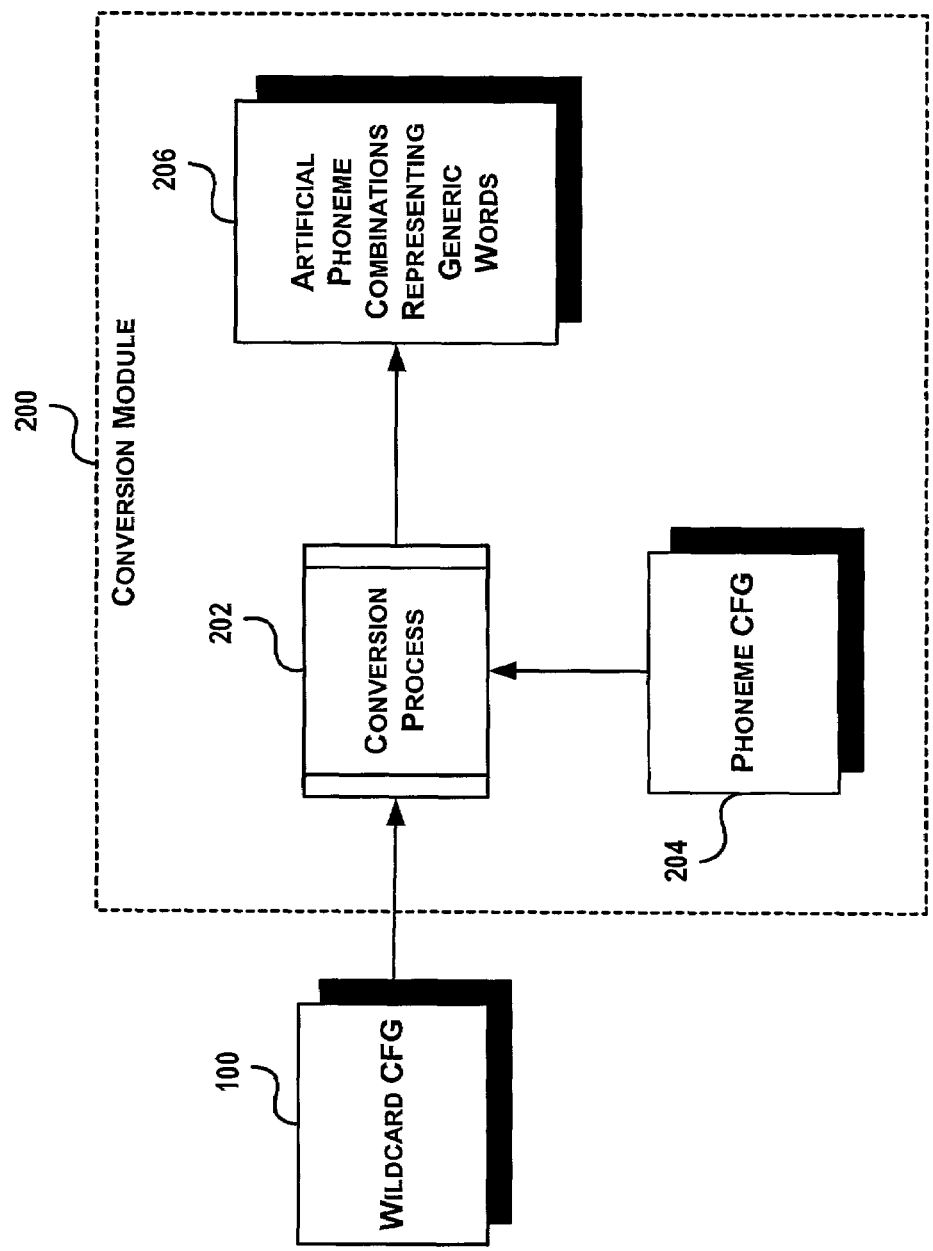
FIG. 2 is a block diagram illustrating a conversion module that converts a wildcard CFG into a set of artificial phoneme combinations.

Generally, as illustrated in FIG. 2, a conversion module 200 converts a wildcard CFG 100 into artificial phoneme combinations representing generic words 206 that are recognizable or processable by a speech engine 104. A conversion process 202 substitutes instances of wildcard identifiers in a wildcard CFG 100 with a phoneme CFG file 204 to generate a set of phoneme combinations representing generic words 206.

Figure 3:
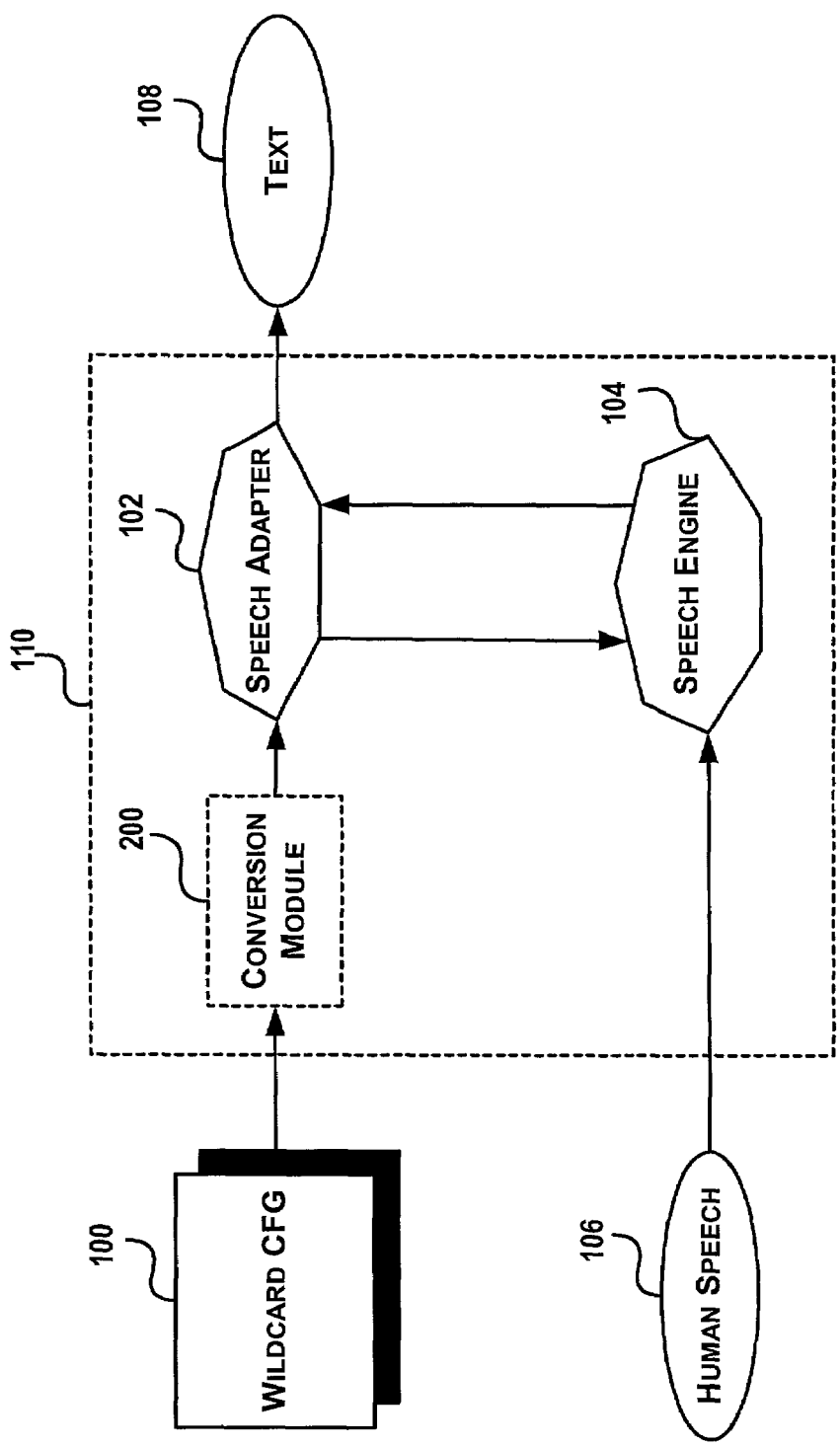
FIG. 3 is a block diagram illustrating a speech recognition system in accordance with one embodiment of the invention in which the current state of the speech adapter and speech engine may be used with the conversion module without modification.

In one embodiment of the invention, as shown in FIG. 3, the artificial phoneme combinations are embedded in a standard CFG file. In this embodiment, a conversion module 200 converts a wildcard CFG file to a standard CFG file (i.e., a CFG file that current, unmodified speech engines are able to recognize) by substituting wildcard identifiers in the wildcard CFG file with artificial phoneme combinations produced by a phoneme CFG file. (Another way of putting this is that a conversion module 200 converts a wildcard CFG file to a standard CFG file by applying rules in a phoneme CFG to produce a set of artificial phoneme combinations.)

The speech adapter 102 loads and compiles the standard CFG into the speech engine 104. When human speech 106 is recognized by the speech engine 104, the speech engine applies the appropriate grammar to determine what was probably spoken by the user. Thus, for a given CFG originating from a wildcard CFG, the speech engine listens for words in accordance with the rules of the given CFG. When the speech engine encounters artificial phoneme combinations (which replaced the wildcard identifier in the wildcard CFG) in the standard CFG, it listens for one of the artificial phoneme combinations. When it hears one, it then cross-references its pronunciation lexicon and vocabulary database to determine one or more words which correspond to the pronunciation, a number of which may be generic words, and a number of which may be non-generic words. These words are returned in a results object. The speech adapter 102 can then query the results object: the generic words (represented by the phoneme combinations) are removed, and the non-generic word having the highest confidence level is selected as the word probably spoken by the user. The word is then returned as text 108 by the speech adapter 102.

Figure 4:
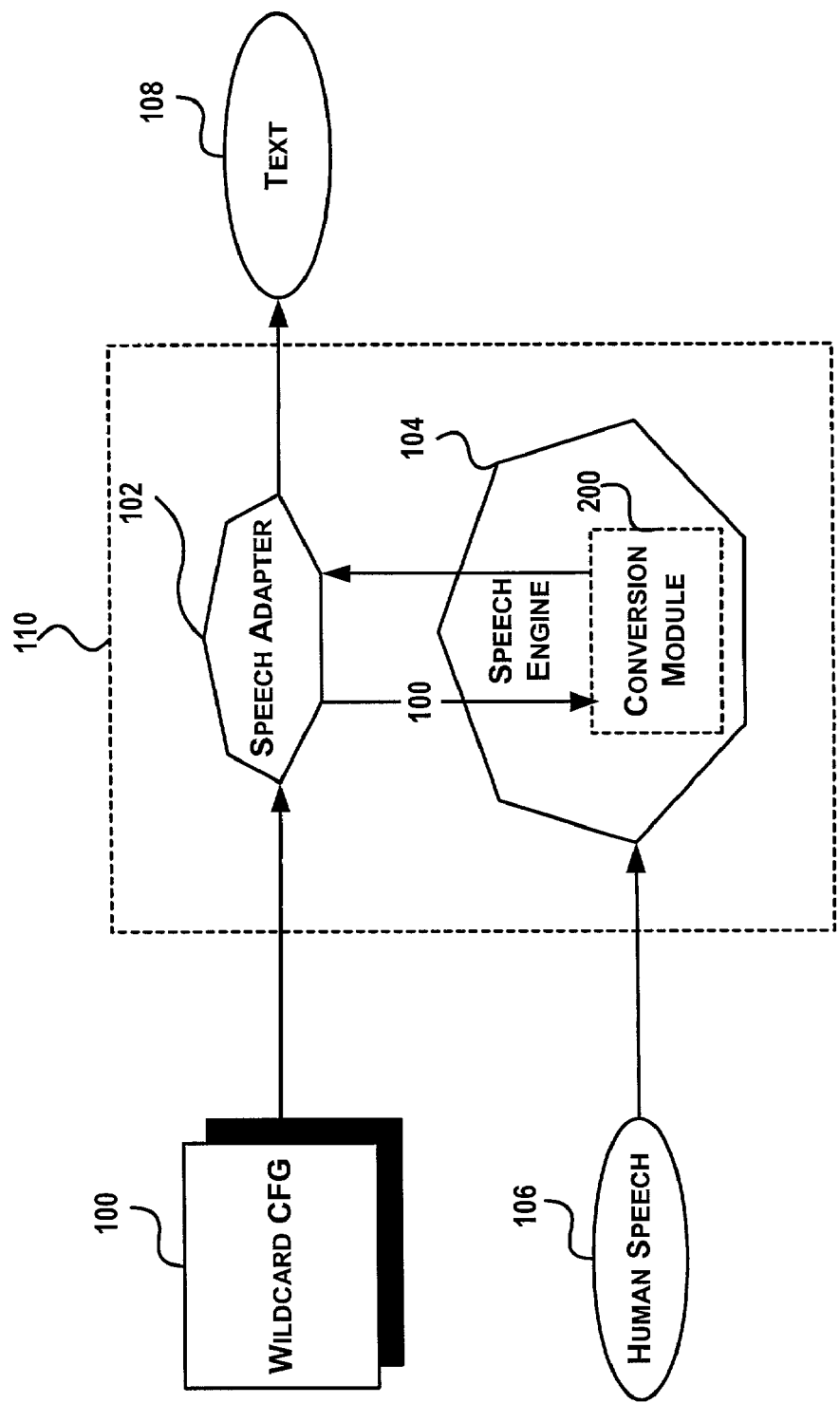
FIG. 4 is a block diagram illustrating a conversion module in accordance with another embodiment of the invention in which a speech engine is modified to incorporate the functionality of a conversion module.

In another embodiment of the invention, as shown in FIG. 4, a speech engine 104 incorporates the functionality of a conversion module 200. A speech adapter 102 loads and compiles a wildcard CFG 100 into a speech engine 104. When human speech 106 is recognized by the speech engine 104, the conversion module 200 of the speech engine 104 directly converts a wildcard CFG file to artificial phoneme combinations, rather than a standard CFG file comprising the artificial phoneme combinations as shown in FIG. 3. (As stated above, another way of putting this is that a conversion module 200 in a speech engine 104 converts a wildcard CFG file to artificial phoneme combinations by applying rules in a phoneme CFG when a wildcard identifier is encountered.) The speech engine 104 then processes the human speech 106 using the artificial phoneme combinations, as discussed above.

Figure 5:
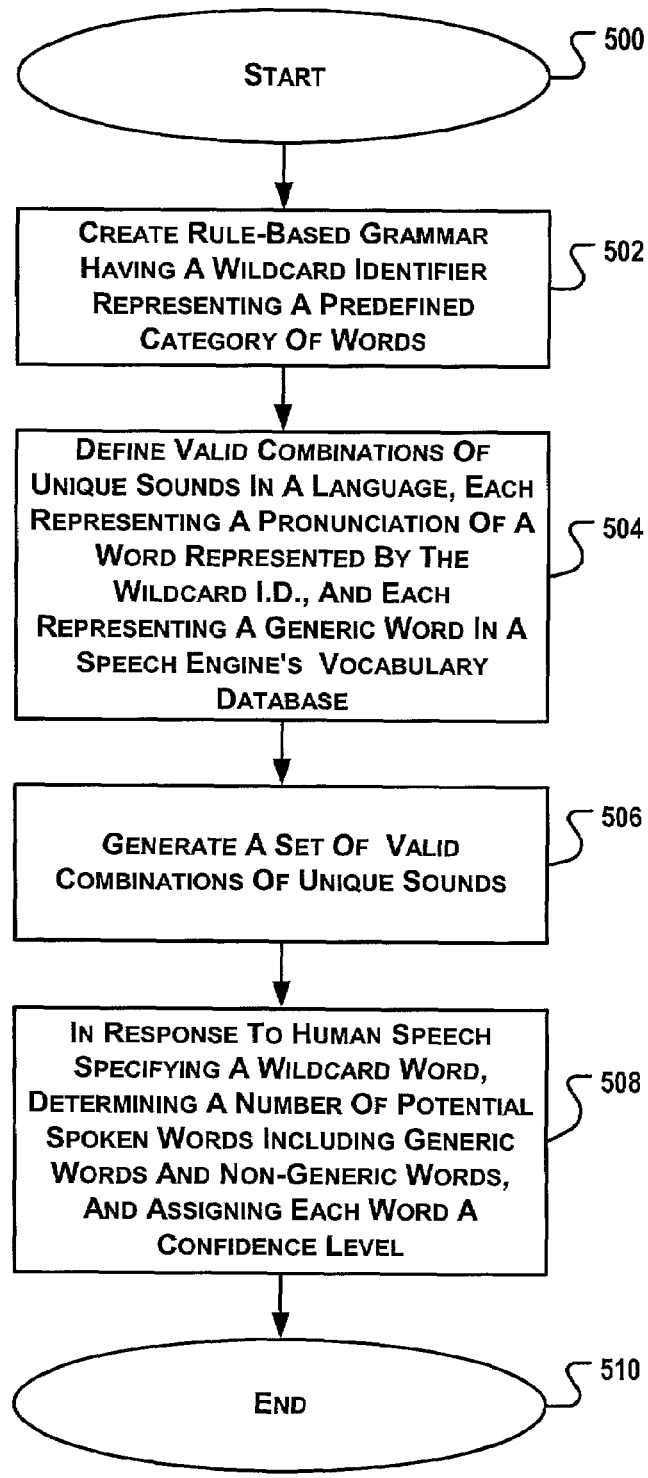
FIG. 5 is a flowchart illustrating a method in accordance with embodiments of the invention.

A method in accordance with embodiments of the invention is shown in FIG. 5, starting at block 500. A wildcard rule-based grammar, such as a CFG, is created at block 502, where the wildcard CFG has a wildcard identifier that represents a predefined category of words. At block 504, valid artificial combinations of unique sounds are then defined that represent pronunciations of the predefined category of words, and that represent generic words in the speech engine's vocabulary database. A set of valid combinations of unique sounds is then generated at block 506. At block 508, a number of potential words comprising generic and non-generic words is determined, and each one is assigned a confidence level. The method ends at block 510.

For example, if a user says "send mail to Tom", where the wildcard CFG file defined above exists in a given speech engine, the speech engine processing an isolated word, can process the sound as follows. (This is assuming that wildcard substitutions, in accordance with FIG. 3 or FIG. 4, for example, have been made.) Using probability analysis, it determines that the phoneme combination having the highest confidence level is associated with the word in the speech engine's vocabulary database "send" by comparing the phoneme combination with the highest confidence level to the pronunciation lexicon in the speech engine. It then expects to hear "mail" in this example. Thus, if the next word spoken is associated with the highest confidence level phoneme combination that sounds like "mail", a confidence level is assigned to each word corresponding to the phoneme combination. (If the spoken word doesn't sound like "mail", then an error is returned.) Since the phoneme combination corresponding to "mail" may also correspond to "male", confidence levels are assigned to each corresponding word. Typically, the word in the CFG is assigned the highest confidence level. In this example, that word is "mail" rather than "male". As a result, "mail" is returned by the speech engine as the spoken word.

The speech engine then expects to hear the word "to". Thus, if the next word spoken is associated with the highest confidence level phoneme combination that sounds like "to", a confidence level is assigned to each word in the speech engine's vocabulary database corresponding to the phoneme combination. (If the spoken word doesn't sound like "to", then an error is returned.) Since the phoneme combination corresponding to "to" may also correspond to "two", or "too", confidence levels are assigned to each corresponding word. In this example, the word having the highest confidence level is "to" rather than "two" or "too". As a result, "to" is returned by the speech engine as the spoken word.

For the last word in the spoken phrase, rather than expecting to hear specified user names, such as "Tom", "Laura", or "Russ", the speech engine expects to hear one of the artificial phoneme combinations defined for the wildcard identifier. Thus, if the next word spoken is associated with the highest confidence level phoneme combination that sounds like "Tom", a confidence level is assigned to each word in the speech engine's vocabulary database corresponding to the phoneme combination. (If the spoken word doesn't sound like one of the artificial phoneme combinations, then an error is returned.) In this example, the speech engine finds "to ohm" and "Tom" in its vocabulary database, two words that have phoneme combinations corresponding to the phoneme combinations determined for the spoken word. A confidence level is assigned to each word. Since the word "to ohm" is defined in the CFG being used, it is assigned a higher confidence level than the word "Tom".

However, since the word "to ohm" represents an artificial phoneme combination, and a generic word defined in the speech engine's vocabulary database, it is not as likely a candidate as the word "Tom". As a result, "Tom", which may be the word with the second highest confidence level, or the word with the highest confidence level that is a non-generic word, is chosen.

Computer System

Figure 6:
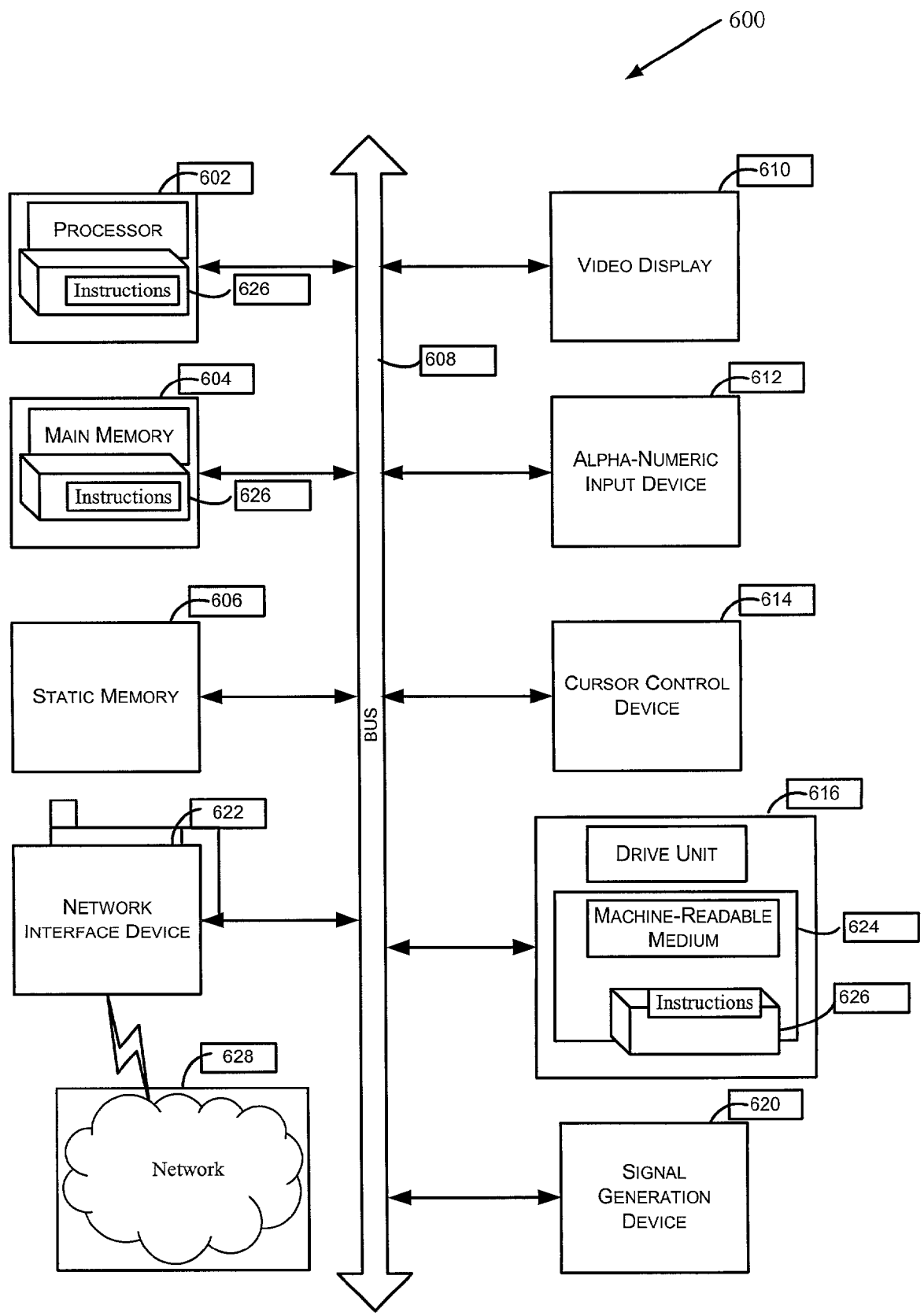
FIG. 6 is a block diagram illustrating a machine, according to one exemplary embodiment, within which software in the form of a series of machine-readable instructions, for performing methods of embodiments of the present invention, may be executed.

FIG. 6 is a diagrammatic representation of a machine in the form of computer system 600 within which software, in the form of a series of machine-readable instructions, for performing any one of the methods discussed above may be executed. The computer system 600 includes a processor 602, a main memory 604 and a static memory 606, which communicate via a bus 608. The computer system 600 is further shown to include a video display unit 610 (e.g., a liquid crystal display (LCD) or a cathode ray tube (CRT)). The computer system 600 also includes an alphanumeric input device 612 (e.g., a keyboard or a microphone), a cursor control device 614 (e.g., a mouse), a disk drive unit 616, a signal generation device 620 (e.g., a speaker) and a network interface device 622 for communicating with a network 628. The disk drive unit 616 accommodates a machine-readable medium 624 on which software 626 embodying any one of the methods described above is stored. The software 626 is shown to also reside, completely or at least partially, within the main memory 604 and/or within the processor 602. The software 626 may furthermore be transmitted or received by the network interface device 622. For the purposes of the present specification, the term "machine-readable medium" shall be taken to include any medium that is capable of storing or encoding a sequence of instructions for execution by a machine, such as the computer system 600, and that causes the machine to perform the methods of the present invention. The term "machine-readable medium" shall be taken to include, but not be limited to, solid-state memories, optical and magnetic disks, and carrier wave signals, as discussed above.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, concepts discussed herein are applicable to any rule-based grammar, to the extent that they exist now or in the future. These concepts should not be construed as being limited to context-free grammars. Furthermore, the specification of artificial phoneme combinations should be understood as of many techniques that can be used to specify artificial combinations of unique sounds in a language. As another example of details which are not to be construed as limiting the invention, a conversion module should be understood as a functionality that can be provided, and should not be construed as a device-specific module. These examples are not exclusive.

What is claimed is:

1. A method comprising:
creating a rule-based grammar having a wildcard identifier in place of a predefined category of words;
defining rules to produce artificial combinations of unique sounds in a language, where each artificial combination represents a pronunciation of the words in the predefined category, and represents a generic word that is defined in a speech engine's vocabulary database;
generating a set of artificial combinations of unique sounds by substituting the wildcard identifier with the rules; and
in response to human speech specifying a wildcard word, determining a set of potential words spoken by the user by finding the generic words and non-generic words that phonetically match the wildcard word, wherein the non-generic words are not part of the rule-based grammar, assigning each of the generic and non-generic words a confidence level based on a set of rules followed by the speech engine, wherein the generic and non-generic words that are part of a particular application are assigned a higher confidence level than the generic and non-generic words that are not part of the particular application, removing the generic words from the set of potential words spoken by the user, and selecting a remaining non-generic word from the set of potential words spoken by the user having a highest confidence level.

2. The method of claim 1, wherein the rule-based grammar comprises a context-free grammar (CFG).

3. The method of claim 1, wherein a unique sound in a language comprises a phoneme.

4. The method of claim 1, wherein said generating a set of artificial combinations of unique sounds by substituting the wildcard identifier with the rules comprises converting the wildcard rule-based grammar into a standard rule-based grammar.

5. A method comprising:
specifying a wildcard context-free grammar (CFG) which includes a wildcard identifier in place of a predefined category of words, each of which are defined in the speech engine's vocabulary database;
specifying a set of rules that define artificial combinations of unique sounds in a language, where each artificial combination represents a pronunciation of the words in the predefined category, and corresponds to a generic word that is defined in a speech engine's vocabulary database;
converting the wildcard CFG file into a recognized CFG grammar file by generating a set of artificial combinations of unique sounds based on the rules; and
in response to human speech having one or more spoken units, generating a results object having a number of generic words corresponding to artificial combinations appropriate to a given spoken unit, and having a number of non-generic words in the speech engine's vocabulary database appropriate to a given spoken unit, wherein the non-generic words are not part of the CFG, each generic word and non-generic word having an associated confidence level based on a set of rules followed by the speech engine, wherein the generic and non-generic words that are part of a particular application are associated with a higher confidence level than the generic and non-generic words that are not part of the particular application, removing the generic words from the results object, and selecting a remaining non-generic word from the results object having a highest confidence level.

6. The method of claim 5, additionally comprising querying the results object for a word having the highest confidence level in the speech engine's vocabulary database.

7. The method of claim 5, wherein a unique sound in a language comprises a phoneme.

8. A tangible machine-readable medium having stored thereon data representing sequences of instructions, the sequences of instructions which, when executed by a processor, cause the processor to perform the following:
create a rule-based grammar having a wildcard identifier in place of a predefined category of words;
define rules to produce artificial combinations of unique sounds in a language, where each artificial combination represents a pronunciation of the words in the predefined category, and represents a generic word that is defined in a speech engine's vocabulary database;
generate a set of artificial combinations of unique sounds by substituting the wildcard identifier with the rules; and
in response to human speech specifying a wildcard word, determine a set of potential words spoken by the user by finding the generic words and non-generic words that phonetically match the wildcard word, wherein the non-generic words are not part of the rule-based grammar, assigning each of the generic and non-generic words a confidence level based on a set of rules followed by the speech engine, wherein the generic and non-generic words that are part of a particular application are assigned a higher confidence level than the generic and non-generic words that are not part of the particular application, removing the generic words from the set of potential words spoken by the user, and selecting a remaining non-generic word from the set of potential words spoken by the user having a highest confidence level.

9. The tangible machine-readable medium of claim 8, wherein the rule-based grammar comprises a context-free grammar (CFG).

10. The tangible machine-readable medium of claim 8, wherein a unique sound in a language comprises a phoneme.

11. An apparatus comprising: at least one processor; and a machine-readable medium having instructions encoded thereon, which when executed by the processor, are capable of directing the processor to:
create a rule-based grammar having a wildcard identifier in place of a predefined category of words;
define rules to produce artificial combinations of unique sounds in a language, where each artificial combination represents a pronunciation of the words in the predefined category, and represents a generic word that is defined in a speech engine's vocabulary database;
generate a set of artificial combinations of unique sounds by substituting the wildcard identifier with the rules; and
in response to human speech specifying a wildcard word, determine a set of potential words spoken by the user by finding the generic words and non-generic words that phonetically match the wildcard word, wherein the non-generic words are not part of the rule-based grammar, assigning each of the generic and non-generic words a confidence level based on a set of rules followed by the speech engine, wherein the generic and non-generic words that are part of a particular application are assigned a higher confidence level than the generic and non-generic words that are not part of the particular application, removing the generic words from the set of potential words spoken by the user, and selecting a remaining non-generic word from the set of potential words spoken by the user having a highest confidence level.

12. The apparatus of claim 11, wherein the rule-based grammar comprises a context-free grammar (CFG).

13. The apparatus of claim 11, wherein a unique sound in a language comprises a phoneme.

14. An apparatus comprising:
  means for creating a rule-based grammar having a wildcard identifier in place of a predefined category of words;
  means for defining rules to produce artificial combinations of unique sounds in a language, where each artificial combination represents a pronunciation of the words in the predefined category, and represents a generic word that is defined in a speech engine's vocabulary database;
  means far generating a set of artificial combinations of unique sounds by substituting the wildcard identifier with the rules; and
  in response to human speech specifying a wildcard word, means for determining a set of potential words spoken by the user by finding the generic words and non-generic words that phonetically match the wildcard word, wherein the non-generic words are not part of the rule-based grammar, assigning each of the generic and non-generic words a confidence level based on a set of rules followed by the speech engine, wherein the generic and non-generic words that are part of a particular application are assigned a higher confidence level than the generic and non-generic words that are not part of the particular application, removing the generic words from the set of potential words spoken by the user, and selecting a remaining non-generic word from the set of potential words spoken by the user having a highest confidence level.

15. The apparatus of claim 14, wherein the rule-based grammar comprises a context-free grammar (CFG).

16. The apparatus of claim 14, wherein a unique sound in a language comprises a phoneme.

17. A system comprising:
  a conversion module to accept a wildcard rule-based grammar file as input, wherein the rule-based grammar has a wildcard identifier in place of a predefined category of words, wherein the rule-based grammar defines rules to produce artificial combinations of unique sounds in a language, and to convert the wildcard rule-based grammar file to a set of artificial combinations of unique sounds in a language by substituting the wildcard identifier with the rules;
  a speech engine to accept human speech having a wildcard word as input, and to determine a set of potential words matching the wildcard word, the set of potential words comprising a number of generic words and non-generic words corresponding to the artificial combinations of unique sounds in a language, wherein the non-generic words are not part of the rule-based grammar; and
  a speech adapter to interact with the speech engine by querying the speech engine for potential words matching the wildcard word, wherein each of the generic and non-generic words are assigned a confidence level based on a set of rules followed by the speech engine, wherein the generic and non-generic words that are part of a particular application are assigned a higher confidence level than the generic and non-generic words that are not part of the particular application, wherein the generic words are removed from the set of potential words, wherein a remaining non-generic word from the set of potential words having a highest confidence level is selected, and returning the selected word which is most likely to match the wildcard word spoken by the user.

18. The system of claim 17, wherein the unique sounds in a language comprise phonemes.

19. The system of claim 17, wherein the rule-based grammar is a context-free grammar (CFG).

20. The system of claim 17, wherein the speech engine comprises the conversion module.

* * * * *